(12) United States Patent
Pavlovski et al.

(10) Patent No.: US 11,520,455 B2
(45) Date of Patent: Dec. 6, 2022

(54) DIORAMIC USER INTERFACE HAVING A USER CUSTOMIZED EXPERIENCE

(75) Inventors: Christopher J. Pavlovski, Westlake (AU); Laurence J. Plant, Southbank (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1849 days.

(21) Appl. No.: 12/494,045

(22) Filed: Jun. 29, 2009

(65) Prior Publication Data

US 2010/0333037 A1    Dec. 30, 2010

(51) Int. Cl.
*G06F 3/0481*    (2022.01)
*G06Q 10/10*    (2012.01)

(52) U.S. Cl.
CPC ........... *G06F 3/0481* (2013.01); *G06Q 10/10* (2013.01)

(58) Field of Classification Search
CPC .............................. G06Q 10/10; G06F 3/0481
USPC ........................................................ 715/848
See application file for complete search history.

(56) References Cited

U.S. PATENT DOCUMENTS

| 9,652,809 | B1* | 5/2017 | Levinson | G06F 16/335 |
| 2003/0132973 | A1* | 7/2003 | Hughes | 345/850 |
| 2005/0054381 | A1* | 3/2005 | Lee et al. | 455/557 |
| 2006/0122939 | A1* | 6/2006 | Cohen et al. | 705/59 |
| 2009/0024696 | A1* | 1/2009 | Fildebrandt | 709/203 |
| 2009/0089689 | A1* | 4/2009 | Clark et al. | 715/762 |
| 2009/0288015 | A1* | 11/2009 | Fujioka | 715/747 |

OTHER PUBLICATIONS

Watsen, K., et al., "A Handheld Computer as an Interaction Device to a Virtual Environment," [online] In Proc of the 3rd Immersive Projection Technology Workshop (IPT '99), 1999.

* cited by examiner

*Primary Examiner* — Angie Badawi
(74) *Attorney, Agent, or Firm* — Cuenot, Forsythe & Kim, LLC

(57) ABSTRACT

The present disclosure teaches a solution for a user customizable abstraction layer for tailoring all operating system, application, and web based interfaces. The interface differs from conventional user interfaces by presenting a dynamic interface which can enable user access across all domains and applications with which the user can interact. The interface can be dynamically built as a user interacts with clients (e.g., devices/applications). Clients can utilize common usage patterns, installed application, installed themes, personal information, and the like, to create a highly customized adaptive user designed and modifiable interface.

17 Claims, 4 Drawing Sheets

DIORAMIC USER INTERFACE HAVING A USER CUSTOMIZED EXPERIENCE

BACKGROUND

The present invention relates to the field of operating systems, virtual worlds and, more particularly, to dioramic user interface having a user customized experience for all user interactions with a personal computer including operating system, applications, and Internet.

A user interface is a human-to-machine boundary though which humans interact with a computing environment. Common user interfaces interact primarily via visual and/or voice modalities. Additional interface modalities include olfactory, touch/haptics, and even taste, which have been implemented with various degrees of success and have not yet emerged within mainstream computing user interfaces. Graphical user interfaces, which are a predominate type of interface are often categorized into two dimensional interfaces or three dimensional ones. Other user interfaces, such as gesture based ones, permitting users to interact by making real-world gestures, are difficult to label within currently used lexicon of interface types. Gesture based interfaces process input (from motion/pressure sensors, electromyogramic detectors, processed video, processed sound, etc.) derived from gestures and can provide visual, audible, tactile, and other output.

Regardless of a modalities used in a user interface, conventionally implemented user interfaces are bound to executing applications at a low level. That is, input provided by a user via a user interface must be generally in a form anticipated by the consuming application. Output generated from an application for presentation in a user interface is generally in a form anticipated by the application. A penumbra between application accepted input/output and that experienced by an end-user is minor. In other words, a scope of user permitted user interface customizations is narrow. For example, users are often able to change a presentation characteristic of output, such as text color, size, and the like. Some user interfaces permit directly mappable conversions of input/output, such as natural language conversions and/or modality conversions (text-to-speech, speech-to-text), which can represent a level of customization regarding an end user interface. Other existing modifications of a user interface fall in a category of scripting a sequence of actions against a trigger, so that a single user input results in an initiation of a sequence of application actions, which would otherwise require multiple user-to-application interactions. Fundamentally, however, each end user interacts via a user interface with an application in fundamentally the same way.

Stated differently, conventional user interfaces are designed in accordance with a constrained paradigm, which is so ingrained that interface developers do not even realize the constraints imposed by this paradigm. Customizations are similarly paradigm constrained, where all customizations are minor presentation characteristic modifications, simple scripts, or transformations providing rudimentary modifications to semantically consistent units of input/output.

To elaborate, mashups and portals are often considered at a forefront for customizations of user interfaces. Portals permit users to gather information from multiple different Web sources and present this information within a single frame, where users can select which portlets (each of which can be from a different source) are to appear within a portal. In some cases, data dependent interactions can occur among the portlets to permit different portlets to react responsive to changes occurring in other ones of the portlets. Mash-ups permit a user to effectively "layer" information from different sources so that a single presentation region of a user interface represents a customized blending of interface elements from multiple sources. For example, via a mash-up a user can create a visual map (from one source) and show appropriately positioned data points (from other sources), which are user selectable to acquire data point specific information.

Both portals and mashups are software constructs rendered in a Web browser and supported by standards implemented at a Web browser level, and therefore are constrained to Web browser defined standards. Portals and mash-ups are largely two dimensional, are unable to dynamically evolve over time, and are contained by administrator defined limitations. That is, porlets and/or widgets used within portals and/or mashups must be supported by the portal or mashup infrastructure. Portals and mashups both largely focus on providing an administrator defined user interface region, which is data-linkable and event reactive to other administrator defined user interface regions. Fundamental characteristics of interface elements, as defined by an administrator, remain immutable.

Effectively, mashups and portal technologies attempt to create modular presentation units that are semi-independent of other presentation units, where a user is permitted to construct an "application" (portal or mashup) by mixing and matching the modular presentation units in a desired fashion. Each unit of a portal or mashup remains a fundamentally fixed presentation unit, able to react to other fixed presentation units in a highly limited fashion in a manner envisioned by the interface developer. While the number and combinations of portlets and widgets that can be aggregated and displayed in portals and mashups increase over time, each frame remains in a form anticipated by the interface developer. That is, a "map" element is always rendered as a map element within a portal/mashup; a graphic is always rendered as that graphic within the portal/mashup; a video element is always rendered as that video element; etc.

As previously noted, three dimensional and virtual world user interfaces exist. A majority of three dimensional user interfaces are application interfaces for a specific game (application). These three dimensional interfaces exist for entertainment system platforms (e.g., WII, PS3, etc.) and for personal computer platforms. These three dimensional application interfaces can have customizable elements, such as permitting a user to modify hair color, body style, clothing, and the like of various characters. Further, a few entertainment applications have included billboards which are updated as a game is played with real advertisements acquired over a network. These customizations are generally defined by an application programmer and are minor in nature (i.e., not changing a fundamental characteristic of an interface presentation unit).

Another existent type of user interface is a virtual world interface, such as those of SECOND LIFE or WORLD OF WARCRAFT. Virtual world interfaces can permit a user to be represented by an avatar, which is able to be that user's proxy for interacting with virtual world objects. Users can personalize appearance and capabilities of their avatars, but only using constructs supported by a virtual world framework. Further, some virtual world programs permit users to construct new virtual geographic regions, which others can visit. All these customizations are inherent in the virtual world framework itself and are constrained to that framework; these are also envisioned by the user interface developer and anticipated by the consuming application. Actions experienced by one virtual world participant are substantially identical to those experienced by another user. That is, when two users are interacting within a virtual world environment, their respective user interfaces are substantially identical. Each user is not permitted to customize aspects of their user interface to deviate from this rigid baseline. Thus, existent "customizations" of virtual world interfaces are preformed in a one-size-fits all manner, which affect all other virtual world participants.

SUMMARY

The present disclosure teaches a solution for a user customizable abstraction layer for tailoring all applications, operating system, and/or web based interfaces. The interface differs from conventional user interfaces by presenting a dynamic interface which can enable user access across all domains and applications with which the user can interact. The interface can be dynamically built as a user interacts with clients (e.g., devices/applications). Clients can utilize common usage patterns, installed application, installed themes, personal information, and the like, to create a highly customized user modifiable interface in a form envisioned by the user, not by the interface developer.

One aspect of the disclosure includes a method for interfacing between a human and a machine. In the method, an application (i.e., where an application is, but not limited to, an operating system, system dependant application, or web application) executing on computing equipment including hardware can be identified. While executing the application, output events can be generated and input events can be responded to. The output events can be directed to a dioramic system and the input events can come from the dioramic system. The dioramic system can include an application independent layer of abstraction between a user and the executing application. The dioramic system can generate a dioramic user interface, which is presented to a user. The dioramic user interface can be tailored in accordance with user specific customizations specific to the dioramic system. The dioramic system can detect each output event and can process the output event in accordance with the user specific customizations to generate output presented within the dioramic user interface. The dioramic system can detect user provided input and can convert the user provided input in accordance with the user specific customizations to generate the input events, which are handled by the executing application. Specifics of the dioramic user interface resulting from the user customizations can be application transparent.

Another aspect of the disclosure can include a dioramic system having an application interaction manager, a diorama rendering engine, a user interaction manager, and a diorama bus. The application interaction manager can receive output events from a plurality of applications and can send input event to the applications. The diorama rendering engine can dynamically generate output for a dioramic user interface from received ones of the output events in accordance with user customizations established within the dioramic system. The user interaction manager can dynamically receive user input from a dioramic user interface and can convert in real-time the user input into the sent input events in accordance with user customizations established with in the dioramic system. The diorama bus can communicatively link the application interaction manager, the diorama rendering engine, and the user interaction manager to each other. The dioramic user interface can be a three dimensional interface independent of the applications, which can include environment characteristics and avatars having characteristics derived from application specific events and events aggregated from multiple applications. Each of the application interaction manager, the diorama rendering engine, and the user interaction manager can include computer program products stored in a physical medium executable by a hardware processor.

Yet another aspect of the disclosure can include a method for interacting between a set of humans and a set of application. In the method, at least one collaboration application executing in a computing space can be identified. The application can concurrently interact with a set of different users in real time, each of the users utilizing a different user interface for the interactions. At least one of the user interfaces can include a dioramic user interface. At least another of the user interfaces can include an application specific interface. The dioramic user interface can be an application transparent interface including a three dimensional interface independent of the application. The dioramic user interface can include environment characteristics and avatars having characteristics derived from application specific events, which change based upon application specific events and events aggregated from multiple applications. For example, a single avatar presented in a dioramic user interface can represent a colleague while event data can be displayed via the avatar, where the event data can be aggregated from multiple applications such as e-mail, instant messaging, calendar, location and news articles, etc. The application is able to exist with programmatic code for the environment characteristics and the avatars. This code and logic can exclusively reside in a dioramic system.

DETAILED DESCRIPTION

Figure 1:
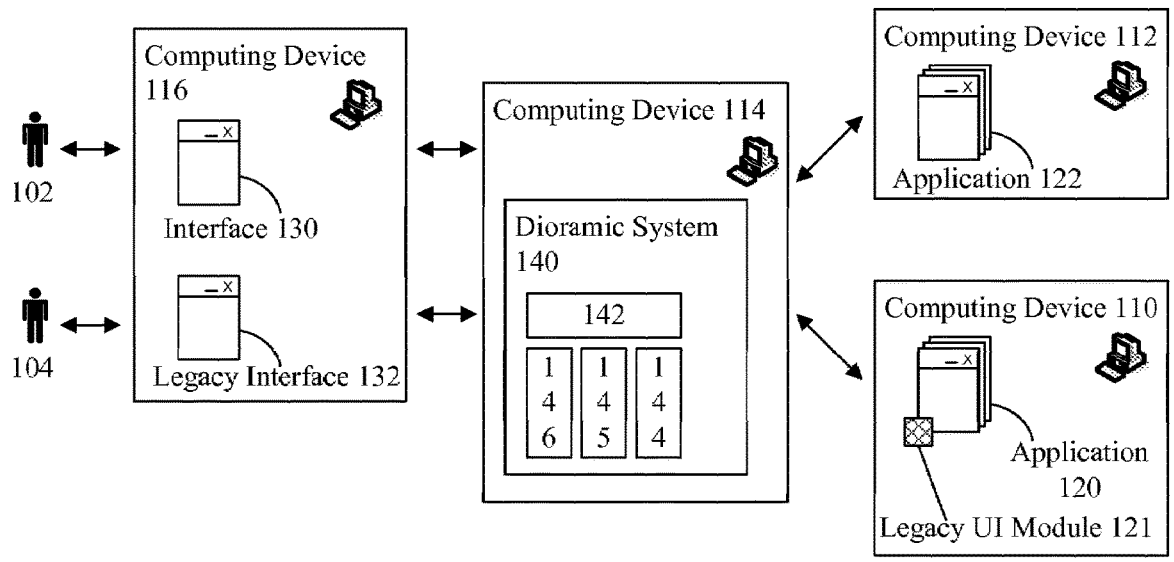
FIG. 1 is a schematic diagram of a system 100 permitting users 102, 104 to interface with machines via a Dioramic User interface 130 in accordance with an embodiment of the inventive arrangements disclosed herein.
Figure 1:
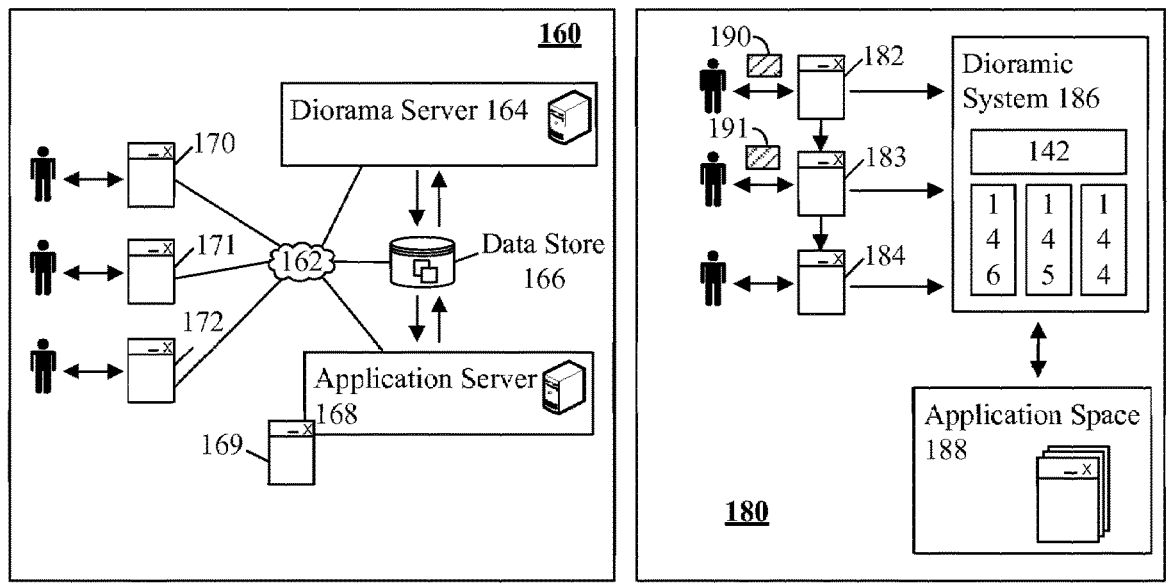
Figure 1:
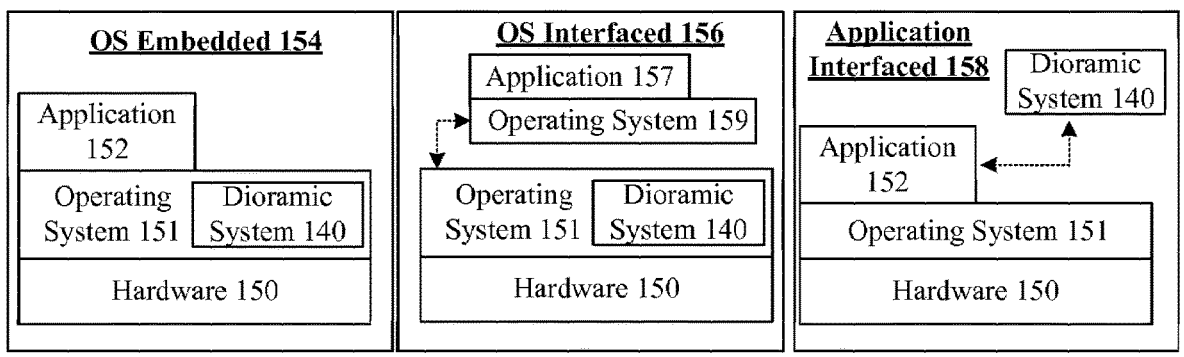

The present disclosure teaches a Dioramic User Interface, which is believed a departure from user interface paradigms of the past. In the disclosure, a user customizable layer of abstraction is implemented between applications and a user interacting with the application. An application in this context can include an operating system, a system dependent application, and/or a Web application. In this abstraction layer, a user can personalize a dioramic interface in a unique manner transparent to applications, which users interact with via the Dioramic User Interface. Customizations of a dioramic interface can include semantic themes, where application input/output is adjusted to conform to the semantic themes of the dioramic interface.

A standard definition for a diorama is: a model which shows a situation, such as an historical event or animals in their natural surroundings, in a way that looks real because of the height, length, and width of what is being shown are accurately represented in comparison with each other. Dioramas can be three-dimensional, dynamic, and interactive. As used herein, a dioramic user interface is an interactive and dynamically changing interface used for human-to-machine interactions, which provides a computing environment that mimics a corresponding real-world environment. The dioramic user interface can be a three dimensional user interface accepting any of a variety of input types (text, pointer movements, voice, gestures, haptics, etc.) and producing output in any of a variety of modalities (vision, audition, haptic, olfaction, gustation, thermoception, equilibrioception, etc.).

In a Dioramic User Interface, different users can interact with each other using different semantic themes, which are transparent to one another. Thus, two different users interacting with each other through Dioramic User Interfaces can have vastly different user experiences, due to interface specific customizations. For instance, one user may be interacting with another user in a dioramic environment that represents a jungle forest, while the other user may be interacting with the same user in a dioramic environment resembling an office workplace.

In the Dioramic User Interface, each person and entity (e.g., application, application collection, data set, etc.), with which a user interacts can be presented by an avatar. Each avatar can have entity specific characteristics, customized by a user which can be represented by a Dioramic Interface Object. Further, different semantic representations of the same Dioramic Interface Object can exist, which depend upon customizable settings (e.g., a banking application can be represented as a banker avatar or a bank building depending upon Dioramic User Interface settings), and interactive behavior with the Dioramic Interface Object can vary accordingly (e.g., a user's avatar can talk to a banker avatar or walk into a bank building, even though both are different representations of the same underlying application object).

An avatar can be an electronic image of a computing environment that represents a user or other entity. An avatar can take on human form and can have avatar specific attributes, such as appearance, personality, dialect, knowledge, abilities, and the like. Avatars, as used herein, are not limited to human form, and can include animals, animated objects, such as humanized inanimate objects that are, for example, commonly included in animated movies.

Further, Dioramic Interface Objects can possess semantically relevant characteristics specific to a given Dioramic User Interface theme. Additionally, these characteristics can be somewhat persistent and evolutionary in nature. For example, a mailman avatar for an email application can appear overweight and carrying a heavy sack, when a quantity of unread emails exist and when a user has been slow in handling his/her email. When a user reads the email, a sack carried by the mailman avatar can empty, while the avatar itself will still appear overweight. A general physical fitness of the mailman avatar can vary over time depending upon user behavior in keeping up with their email processing habits. Hence, as a user's upkeep habits improve, the mailman avatar can slowly appear more fit.

The exact same interactions can be depicted, in an entirely different manner, where customized interface characteristics remain application transparent. For example, an animal theme can be applied to the Dioramic User Interface, where the email application is represented by a bear's den, where the den is tidy or untidy in correspondence to a quantity of unread email, and the bear's age depicts a user's level of responsiveness when handling email communications.

It should be appreciated that a Dioramic User interface can be three dimensional and can utilize any of a variety of interactive modalities. Further, Dioramic User Interface concepts can be application and platform independent. Specifics of a Dioramic User interface can be user specific, even when real-time interactions among different users occur. Thus, each user of a Dioramic User Interface interacts with a computing space in accordance with their own themes, settings, customizations that can result in vastly different (and personal) user experiences, which span across application defined boundaries. Effectively, through Dioramic User Interfaces each user can create his/her own tailored virtual world through which computing interactions occur.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram of a system 100 permitting users 102, 104 to interface with machines via a Dioramic User interface 130 in accordance with an embodiment of the inventive arrangements disclosed herein. Notably, dioramic system 140 establishes a layer of abstraction between executing applications 120, 122 and a dioramic user interface 130 through which a user 102 interacts with the applications 120, 122. System 130 customizations can be implemented in a highly user 102 tailored manner without affecting the application 120, 122 itself. That is, from an application 120, 122 perspective, specifics (including user customizations) of the dioramic user interface 130 can be transparent. Further, the dioramic system 140 may form part of the underlying operating system executing on the computing device 114, or a layer upon the operating system that also provide a dioramic user interface for all operating system user interactions.

In system 100, dioramic system 140 includes an application interaction manager 144, a diorama rendering engine 145, and a user interaction manager 146 interconnected via the diorama bus 142. Applications 120, 122 can execute on computing devices 112, 110, where an application program interface (API) of interface 130 can interact with application 122, 120 data exchanges. More specifically, the application interaction manager 144 can handle requests from the applications 120, 122 and can issue messages to the applications 120, 122. The diorama rendering engine 145 can manage the generation of the appropriate dioramic user interface 130. The user interaction manager 146 can manage user input. The bus 142 can include a set of component integration systems including, but not limited to, Web services, message brokers, enterprise service bus, and/or bespoke integration.

The applications 120 and 122 can include computer program products specifically designed for use with a dioramic user interface 130 and/or can include standard "legacy" computer program products able to be executed by a computing device 110, 112, 114, 116. Thus, one or more of the applications 120 can include a legacy user interface module 121, which can generate a legacy user interface 132. Each application 120, 122 can be an instance of an operating system, a system dependent application, and/or a Web application. Each computing device 110, 112, 114, 116 can include one or more central processing unit (CPU), a non-volatile memory, and a memory interconnected via a bus, where the CPU executes instructions of computer program products.

One or more of the applications, such as application 120, can permit two or more users 102, 104 to concurrently interact with each other in real time or near real time. For example, user 102 can interface with application 120 using interface 130 presented on computing device 116. Diagram 160 further expresses interactions involving a set of multiple users. In diagram 160, a set of users can each be presented with a unique user interface 170, 171, 172, one or more of which can be a dioramic user interface. The computing devices presenting the interfaces 170-172 can be linked to a network 162 to which a dioramic server 164, a data store 166, and an application server 168 is communicatively linked. Application server 168 can serve one or more applications 169 (which could be any one of the applications 120, 122). Dioramic server 164 can implement an architecture shown for dioramic system 140 utilizing a set (one or more) of computing devices. User specific settings for dioramic user interfaces used by dioramic server 164 can be stored and managed by data repository 166. Appreciably, the interfaces 170, 171, 172 of each user can vary significantly from those 170, 171, 172 of other users. That is, each user experiences a customized version of the interactions, which are occurring in real time or near real time. The user specific customizations are in accordance with user specific dioramic settings.

Diagram 180 emphasizes another important aspect of system 100. Specifically, diagram 180 shows that the dioramic system 186 is a communication intermediary (layer of abstraction) between a dioramic user interface 182-184 and an application space 188, where applications execute. This relationship permits a user to change interactive interfaces during an application session without necessarily interrupting the application session. That is, the changes to interfaces 182-184, can be exclusively handled by system 186 in a manner transparent to application space 188. Consequently, a user can issue a change 190 to their dioramic user interface 182, which is sent to system 186, and which results in interface 183. Then, the user can opt to interact with a legacy interface 184 by sending a command 191 to the dioramic system 186, which results in a presentation of interface 184.

In one embodiment, a user can be presented with multiple different interfaces 182-184 concurrently, where interactions in any interface 182-184 result in data exchanges with the application space 188, and potentially result in corresponding changes dynamically occurring in other ones of the interfaces 182-184. Thus, a user can choose to interact with an interface 182-184 most intuitive for conducting a desired task and not be restricted to a single interactive paradigm.

In one arrangement, the dioramic system 140 can interface between applications 122, 120 and users 102 in different manners, a few of which are shown by embodiments 154, 156, and 158. Embodiment 154 shows an operating system embedded configuration, where the dioramic system 140 is a component or layer of an operating system 151. For example, the hardware 150 can be hardware of device 116, which includes an OS 115, upon which applications 152 (e.g., application 122, 120) run. In other words, the OS embedded embodiment 154 can be one for a stand-alone system having a hardware layer 150, an OS layer 151, and an application layer 152.

Embodiment 156 is an OS interfaced embodiment, where an application 157 interfaces with an operating system layer 159 of a device, which in turn interfaces with dioramic system 140 via an OS layer 151. The dioramic system 140 can be implemented in a device 114 remotely located from device 116 that executes the application 157. An alternative to arrangements shown in embodiment 154 and/or 156 is to have the dioramic system 140 be implemented in an independent layer co-located with the OS layer 151, in which case data exchanges can occur between these co-located layers.

Embodiment 158 is an application interfaced embodiment, where applications (e.g., application 122, 120) executing in an application layer 152 directly interact with dioramic system 140. For example, application specific events, input, and output can be communicated back and forth to the dioramic system 140.

Within a single implementation instance, multiple ones of the embodiments 154, 156, 158 for interfacing with dioramic system 140 can be combined. For example, three different running applications can be aggregated into a single Dioramic User Interface 130. A first application can execute upon a computing device 116 upon which the interface 130 is presented. This device 116 can include a dioramic system 140 embedded within the OS upon which the first application runs (i.e., OS embedded embodiment 154). A second application (application 157) can execute upon a remote computing device 114, which has its own hardware, OS 159, and applications 157. Interactions between computing device 114 and the dioramic system 140 embedded in the OS of device 116 can occur at the OS level of device 114 (i.e., OS interfaced embodiment 156). A third application can be a Web application executing upon a computing device 112, which may be a Web server. The Web application (e.g., the third application) can directly interact with the dioramic system 140 of device 116 (i.e., application interfaced embodiment 158) or can interact with the OS layer, in which a dioramic system 140 is embedded.

It should be appreciated that computing devices 110-116 can include a wide variety of software/hardware platforms including personal computers, wearable computers, distributed processing systems, kiosks, portable multimedia devices, mobile phones, mobile computing devices, modular computing devices, and the like. System 100 can be configured to cooperative interact with any computing device and/or platform. In one embodiment, system 100 can permit the diorama to roam as the user interacts with different devices, resulting in ubiquitous computing by enabling user dioramic settings to "follow" the user. That is, the system 100 does not have to be tied to a particular system, device, and/or access network.

The interfaces 170-172 can be user interfaces permitting real-time or near real-time interaction with application 169. Interfaces 170-172 can be concurrently presented which can have multiple modalities which can be synchronized or independently updated. Mechanisms to update interfaces can include synchronous and/or asynchronous means including asynchronous JavaScript and Extensible Markup Language (XML), publish/subscribe services, and the like. In one embodiment, users of interface 170-172 can share one or more customizations with other users of interface 170-172. That is, interface 170 user can view and interact with a customization used by user of interface 171. Interfaces 170-172 can include, but is not limited to, graphical user interfaces (GUI), voice user interfaces (VUI), text user interfaces, multi-modal interfaces, tactile interfaces, and the like.

As shown herein, network 162 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 162 can include local components and data pathways necessary for communications to be exchanged among computing device components and between integrated device components and peripheral devices. The network 162 can also include network equipment, such as routers, data lines, hubs, and intermediary servers which together form a packet-based network, such as the Internet or an intranet. The network 162 can further include circuit-based communication components and mobile communication components, such as telephony switches, modems, cellular communication towers, and the like. The network 162 can include line based and/or wireless communication pathways.

Data store 166 can be physically implemented within any type of hardware including, but not limited to, a magnetic disk, an optical disk, a semiconductor memory, a digitally encoded plastic memory, a holographic memory, or any other recording medium. The data store 166 can be stand-alone storage units as well as a storage unit formed from a plurality of physical devices, which may be remotely located from one another. Additionally, information can be stored within the data store 166 in a variety of manners. For example, information can be stored within a database structure or can be stored within one or more files of a file storage system, where each file may or may not be indexed for information searching purposes.

As used herein, legacy interface 132 can be any conventional interface not conforming to a dioramic interface model. Legacy interface 132 can include, graphical user interfaces (GUI), voice user interfaces (GUI), text user interfaces, and the like. Legacy interface 132 functionality can be enabled by legacy UI module 121 which can provide one or more standard legacy interfaces upon user request.

Applications 122, 169 can be computer software comprising of programmatic code able to be stored in a digitally recordable medium. Applications 122, 169 can include locally executing software, remotely executable software, Web services, and the like. Diorama can be independent software objects able to be rendered in any proximate computing device implementing the framework shown in system 100.

Figure 2:
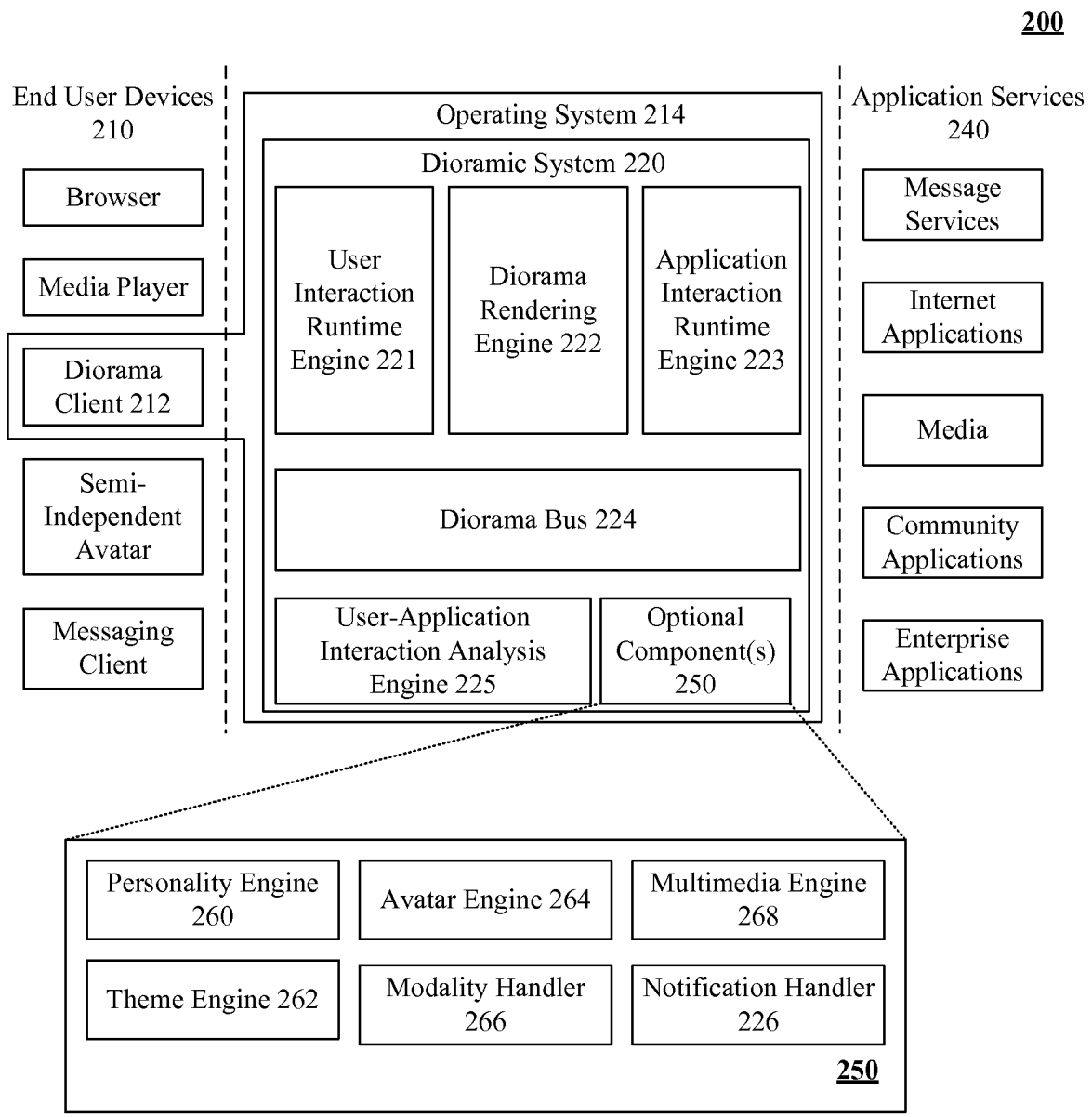
FIG. 2 is a schematic diagram illustrating an embodiment for a set of interactions between end user devices, a dioramic system, and applications for a dioramic user interface in accordance with an embodiment of the inventive arrangements disclosed herein.

FIG. 2 is a schematic diagram illustrating an embodiment for a set of interactions between end user devices, a dioramic system, and applications (which include operating system(s), system dependent application(s), and/or Web application(s)) for a dioramic user interface in accordance with an embodiment of the inventive arrangements disclosed herein.

In system 200, dioramic system 220 can permit application services 240 to be presented in a user interface of an end-user device 210. A user interface can be associated with diorama client 212 enabling presentation of application services 240 in a user customized manner. Client 212 can provide the necessary software/hardware implements (e.g., touch screen) for user interaction with end user devices 210. Exposed functionality from devices 210 can be registered with system 220 to enable client 212 to operate on any hardware/software platform. System 220 can permit application services 240 to be accessed through client 212 without requiring modifications to application services 240. Application services 240 can include, but is not limited to, message exchange applications, Internet applications, media, community applications, enterprise applications, and the like. The application services 240 can be implemented at various levels of granularity. For example, the services 240 can be OS services, Web based services, and/or services of system dependent applications.

In one embodiment, the dioramic system 220 can be implemented within a layer of the operating system 214 of the diorama client 212. System 214 can be implemented as an integrated layer of the OS 214 or can be implemented as an optional extension (e.g., abstraction layer) to the OS 214. When implemented as an OS extension, the dioramic system 220 can adds functionality of providing dioramic user interfaces, which would otherwise be absent from the OS 214. In another embodiment, the dioramic system 220 can be implemented separate from the OS 214, yet designed to collaborate with the OS 214 and OS handled events, input, output, etc. In such an embodiment, system 220 can be implemented in an OS 214 independent fashion, or can be implemented to function with multiple different OS's through OS specific interfaces. In one embodiment, the Dioramic system 220 can be implemented as a software service (e.g., a Web service), which provides the functionality expressed herein.

System 220 can include components 221-225. In one embodiment, one or more of components 260-268 can be included in system 220, as well. System 220 can add a software abstraction layer able to automatically identify and register exposed events/services from devices 210 and/or application services 240. As such, system 220 can utilize any programming model compatible with the software/hardware platform of devices 210. In one embodiment, system 220 can be a plug-in solution requiring minimal configuration prior to usage.

User interaction runtime engine 221 can maintain user configuration and interaction information. Upon initial usage, engine 221 can provide the user with the set of recommended dioramas and avatars for the user's applications and interaction behavior. The engine 221 can provide one or more interfaces which the user can configure or adapt. Engine 221 can maintain established configuration preferences and update the preferences in response to interface changes. For instance, notification event configuration for different dioramas and avatars can be automatically determined and managed by engine 221.

Engine 221 can generate interface artifacts (e.g., graphics) for an interface and associated avatars. In one embodiment, engine 221 can convey instructions to applications which generate their own graphics and user interface. The generated graphics can be managed by engine 221, which can receive user/application triggered events and update the graphics in response to the events.

The diorama rendering engine 222 can dynamically generate output for a dioramic user interface from received ones of the output events in accordance with user customizations established within the dioramic system 200. In one embodiment, if the system cannot detect user activity in the interface or from other applications, system 220 can notify the user of events using external messaging systems such as SMS, email, text exchange, and the like.

Notification of interface events can be performed by notification service of notification handler 226. The notification handler 226 can be implemented within the diorama rendering engine 222 or can be provided as an optional component 250, depending on implementation choices. A notification handler 226 can monitor applications and/or events to determine when and how the user should be notified of a change or an event of interest. Notification settings can be utilized to determine handler 226 behavior. In one instance, the notification handler 226 can intelligently notify user based on user usage patterns and behavior models. For instance, if a user is interacting with an avatar of a social networking application, notifications can be presented to the user via the social networking avatar.

Application interaction runtime engine 223 can detect and identify application events and/or data which can be presented to a user in client 212. Engine 223 can be configured to access multiple applications on the user's behalf engaging in authentication and authorization actions where necessary. Engine 223 can ensure transactions and requests are conveyed to the appropriate application 240. Further, engine 223 can utilize application profile data to determine appropriate data formats, protocols, authentication mechanisms, and the like.

User-application interaction analysis engine 225 can monitor user interactions with the unmodified application services 240 to create a model for the user interactions. Engine 225 can be used to create application profiles through identifying meaningful application behavior and user interaction with devices 210. Over a prolonged duration, a set of interaction data can be collected and analysis of the aggregated data can identify patterns of interactions. These patterns can be used to establish the application profiles which can act as the metadata model with associated rules describing user interactions with applications 240. That is, application states/events can be semantically mapped to avatar behaviors/appearance, diorama changes, and the like. Primitive services offered by the application can be established as new avatars or entities which can be reused for other applications. Further, engine 225 can monitor user behavior to identify applications, events, and/or data of interest to the user. As such, client 212 can present an interface dynamically customized to a user's needs.

The interaction analysis engine 225 can identify candidate dioramas and/or avatars suited to supporting the user's 3D interaction with the external applications 240. This can be accomplished by comparing the established application interaction model with other existing application interaction models, dioramas, and avatars. For instance, a catalog of published dioramas and avatar attributes can be used to determine appropriate candidates for a user. As the user behavior and application 240 evolves over time, and as new avatars and dioramas become available, the user can be automatically notified of more suitable interface elements.

The engine 225 can identify gaps in existing dioramas and avatars which do not cover the scope of interactions required by the applications 240. Users can accept default interactions or request the system to externally seek suitable avatars. Additionally, the interaction model can be published to a developer community enabling a new avatar and/or an extension to an existing avatar to be created. Developers can review the published requirements and can extend existing avatars. Alternatively, developers can build new avatars to cover the published type of interactions.

System 200 can utilize conventional scheduling and timing mechanisms to maintain synchronicity between devices 210 and application services 240. For instance, stateful request tracking can ensure responses from the application are processed in appropriate order.

System 200 can include optional components which can extend or enhance the system's functionality. Components 250 can include, but are not limited to, personality engine 260, theme engine 262, avatar engine 264, modality handler 266, and/or multimedia engine 268.

Personality engine 260 can enable avatars to exhibit customized behaviors which can change over time depending on user interaction and/or application states/events.

Engine 260 can utilize baseline attributes such as aggressiveness, helpfulness, verbosity, and the like to define avatar behavior. Engine 260 can enable avatars to have express moods which can affect the way user interaction is interpreted.

Theme engine 262 can allow dioramas to be themed to user/developer specification. Themes can alter the semantic content permitting customization of user interaction, appearance, and the like. Since the semantic shifts which occur between themes, complex mappings can be built from primitive entities defined within the dioramic system framework including, but not limited to, application events, application states, user preferences, and the like.

In one embodiment, engine 262 can parse XML theme files to determine interface functionality and/or appearance. Themes can be temporal such as themes for promotional offers, seasonal themes, and the like. Engine 262 can allow users to export themes for distribution to other users which can enable a community to grow around diorama themes. For instance, a gothic theme can be community created and supported through users sharing portions of themes (e.g., avatars, landscapes, buildings, etc). Further, theme restrictions and licensing can be enabled through engine 264. Engine 264 can store rules and/or security information for presenting and storing themes. For instance, a theme can be temporarily presented to a user for a session and be automatically removed once the session is ended.

Avatar engine 264 can be used to define avatar presence, configuration, and behavior. Engine 264 can allow physical attributes as well as non physical attributes (e.g., behavioral patterns) to be established for avatars. Additionally engine 264 can be used to control how the avatar can be interacted with, avatar capabilities, restrictions, appearances, licensing, and the like. For instance, avatar engine 264 can restrict interaction to non-violent interactions with other avatars. In one embodiment, engine 264 can permit alternative renderings for avatars such as facilities, objects, and the like. For instance, color schemes for avatars can be automatically adjusted for color-blind individuals.

With multiple diorama client 212 interfaces, multiple modalities can be maintained for different users. Modality handler 266 can be used to seamlessly map modalities to one another. Modality mappings can include, but are not limited to, speech-to-text, text-to-speech, text-to-video, video-to-text, text-to-haptic feedback, and the like. Handler 266 can utilize local and/or remote applications/services to enable modality translation to occur. In one embodiment, handler 266 can automatically adapt modalities based on the user specified diorama theme and/or preferences.

Multimedia engine 268 can be employed to handle storing, usage, and/or presentation of multimedia artifacts associated with dioramic system 220. In one embodiment, automated file type conversions can be facilitated by Web services allowing users to seamlessly interact with different formats. For instance, a portable network graphic (PNG) image can be transmitted to a user as a bitmap when a user's system/diorama does not support the PNG format. Additionally, engine 268 can provide support for copyright restrictions, licensing, and the like.

It should be appreciated, that components disclosed herein can be loosely coupled to enable dioramas to be achieved. Components 221-225, 250 can be standards based which can permit high compatibility and reusability to be attained. Components of system 200 can be arranged into a service framework which can be provided by a variety of different businesses. Additionally, components of system 200 can be plug-ins which can be sold to extend the functionality of dioramas. Combinations of these business models can permit a rich competitive market to exist where users can directly benefit which results in an enhanced user experience.

Figure 3:
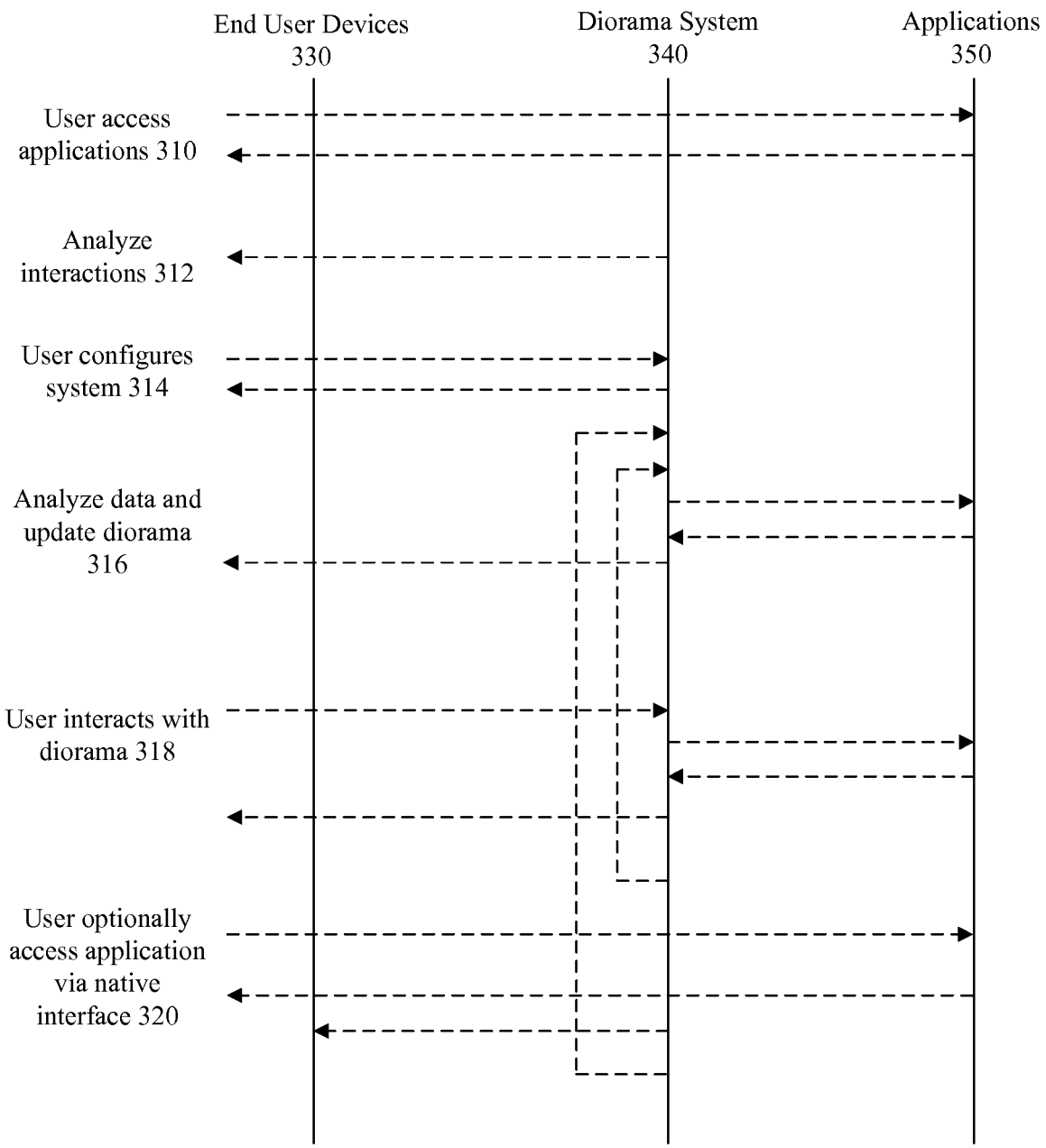
FIG. 3 is a sequence diagram illustrating a set of interactions 330-350 between end user devices, a dioramic system, and applications (which include operating system(s), system dependent application(s), and/or Web application(s)) for a dioramic user interface in accordance with an embodiment of the inventive arrangements disclosed herein.

FIG. 3 is a sequence diagram illustrating a set of interactions between end user devices 330, a dioramic system 340, and applications 350 (which include operating system(s), system dependent application(s), and/or Web application(s)) for a dioramic user interface in accordance with an embodiment of the inventive arrangements disclosed herein. In sequence diagram 300, dioramic system 340 can facilitate the presentation of interface events and/or entities to a user. Dioramic system 340 can act as an intermediary receiving user input, processing interactions, and presenting output for application 350 in a user customized manner. System 340 can be transparent to end user devices 330 and can optionally allow direct access to applications 350 (e.g., legacy interfaces).

Upon initial deployment, dioramic system 340 can require initialization/setup actions to be performed. Alternatively, dioramic system 340 can be preconfigured and deployed readily without requiring user/administrator configuration. When user access application 310 occurs, system 340 can monitor user interactions to determine common usage patterns and behaviors. System 340 can be configured to monitor usage continually, providing refinements to user interactions over an extended period. Once interaction data is collected, the system 340 can analyze interactions (e.g., action 312) to determine candidate dioramas and/or avatars. The candidates can be automatically adopted or can be presented to user as recommendations. User system configuration 314 event can trigger system 340 to present interfaces and/or tools for configuring dioramas/avatars. Interfaces can include, configuration dialogs, wizard configuration dialog, and the like. Tools can include community created tools, developer established utilities, service based tools, and the like.

As applications 350 changes state, data can be analyzed by system 340 and the diorama can be updated accordingly, as shown in event 316. Updates can change system 340 in response to events and/or conditions determined by a user. In one embodiment, updates can be event driven such as application 350 specific events, combinatorial application events, and the like. For instance, a user can be notified only when a third urgent e-mail from a specific person is received and the publication of news of a customer when a customer meeting is scheduled in the coming week.

In one embodiment, community events can trigger updates/changes in system 340. A notification service can intelligently analyze and model user behavior to determine similar behaviors among users. The models can be compared to behavior models of other users to identify which dioramas, avatars, and applications are being used by people within this user's social network. For instance, popular diorama and/or avatars can be determined and information about these artifacts can be conveyed to users interested in emerging trends.

User interaction with diorama 318 occurrence can trigger changes in applications 350. Diorama 340 can communicate requests to applications 350 which can process and fulfill requests. Application 350 can convey responses to dioramic system 340 which can update the diorama interface on devices 330 to present application 350 response.

Actions 316-320 can continuously be executed as the interface is existent and/or user interaction is detected.

Users can optionally access applications 350 via the native interface without requiring changes to system 340.

For instance, the native user interface of applications 350 can be presented within a diorama or can be presented separately without a diorama interface present.

Drawings presented herein are for illustrative purposes only and should not be construed to limit the invention in any regard. It should be understood that the interactions depicted in sequence diagram 300 are not limited to applications and can include services, computing resources, and the like. Actions 316, 318 can continually repeat allowing a diorama to constantly react to user, device 330, and application 350 changes.

Figure 4:
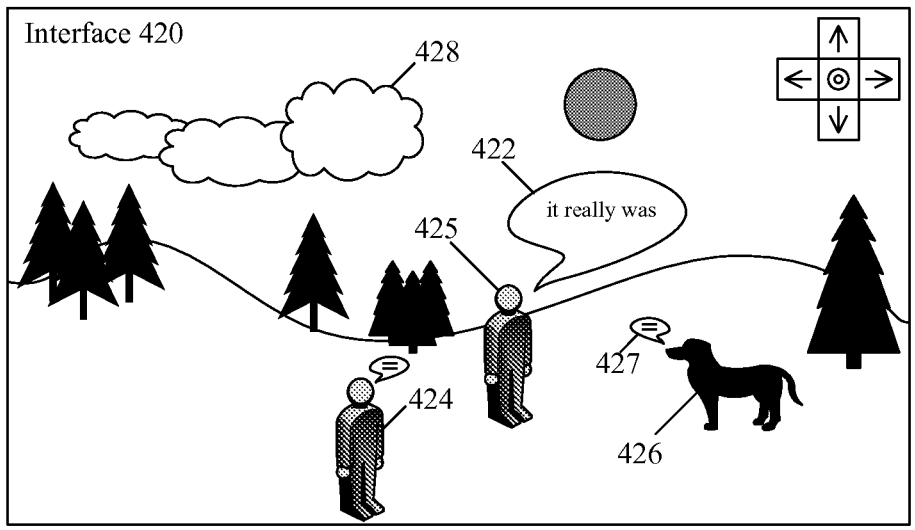
FIG. 4 is a schematic diagram illustrating a set of dioramic user interfaces and a legacy interface in accordance with an embodiment of the inventive arrangements disclosed herein.
Figure 4:
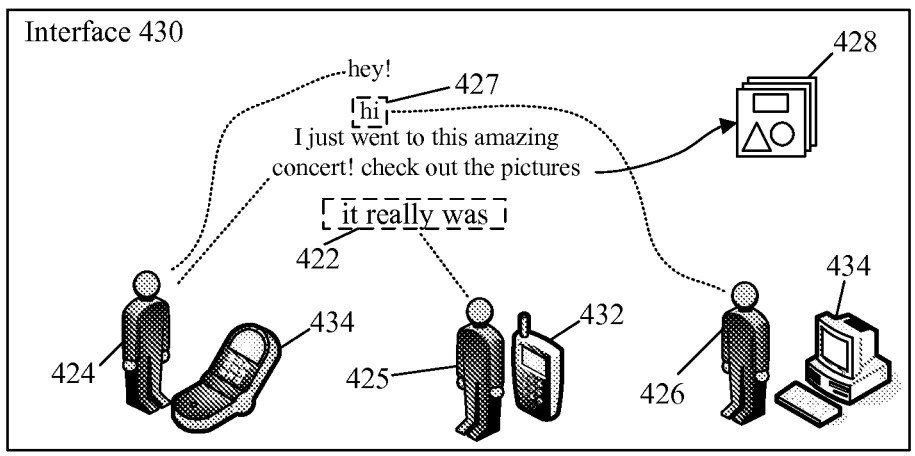
Figure 4:
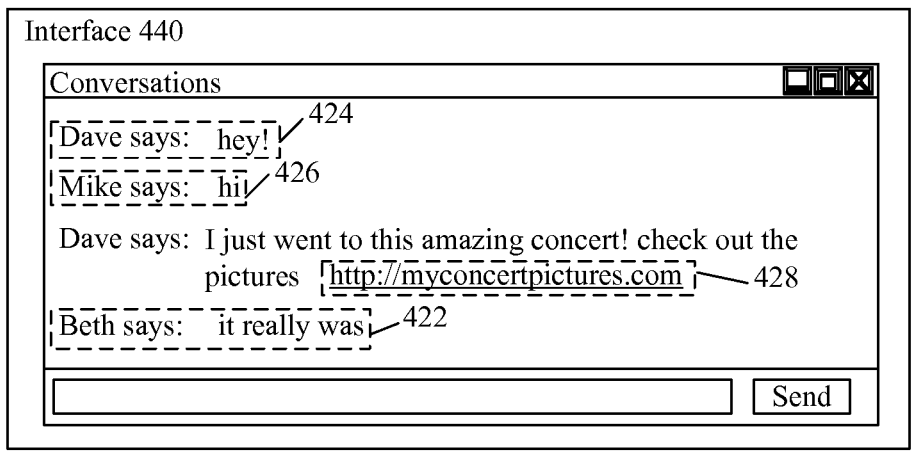

FIG. 4 is a schematic diagram illustrating a set of dioramic user interfaces and a legacy interface in accordance with an embodiment of the inventive arrangements disclosed herein. Interface 420, 430, 440 can represent a single application being interacted with by multiple users using different interfaces. Interface 420, 430 can be dioramic user interfaces conforming to appearances and behaviors described herein. Interface 420 can represent a diorama illustrating a landscape theme with users 424-426 interacting in a text exchange session. Interface 430 can shows the same text exchange session in a second user's interface which can also be a diorama interface. Interface 440 can represent a legacy interface (e.g., instant message application) being used by a third user for participating in the same text exchange session. The dioramic interface is application and platform independent (and transparent), which permits users of a dioramic interface to interact with others users who can be presented with a vastly different user interfaces.

Each interface 420, 430, 440 can present the same semantic content (e.g., application data) in one or more user customized fashions. Text exchange conversation 422, 427 can be presented in interface specific ways. In one example, text 422 can be presented as a graphical chat bubble over the avatar of the appropriate participating user in interface 420, as a free floating text element in interface 430, and in a text window in interface 440. Thus, each interface can permit multiple different users using different interfaces (e.g., dioramas, standard interfaces, legacy interfaces) to interact transparently.

In interface 420, avatars 424-426 can be presented in a variety of means depending on user interaction, user activity, and/or diorama theme. For instance, a user's avatar (e.g., Mike) can be a dog 426 when the diorama theme is a landscape or when talking with user 424. Interface 420 can include default mechanisms for handling semantic content not previously defined. Content can be presented using default avatars, common interaction models, and the like. For instance, slideshow content can be presented as clouds 428 which can be viewed and modified by the user upon interaction.

In interface 430, avatars 424-426 can be presented with associated avatars 432-436 in a diorama which can provide a variety of information. For instance, avatars 432-436 can provide location information, interface information (e.g., theme), and the like. In one embodiment, the same content 428 can be presented in interface 430 as an image slideshow which can automatically present pictures in real-time.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method executing within a dioramic system of a computer hardware system, comprising:
    establishing a layer of abstraction between an executing application and a dioramic user interface within an end user device of a user;
    modifying the dioramic user interface using a diorama selected by the user;
    receiving, by the layer of abstraction, a user interaction with the dioramic user interface by the user;
    facilitating an interaction with the executing application based upon the user interaction; and
    causing the diorama to be updated within the dioramic user interface based upon the user interaction, wherein
    the dioramic user interface
        is a three dimensional user interface independent of the executing application,
        visually represents a person and an entity with which the user interacts, respectively, as avatars in the user-selected diorama, and
        is unique to the user,
    the user-selected diorama is an independent software object that is rendered by a user interaction runtime engine that provides the dioramic user interface, and
    the user interacts with the executing application by directing an avatar of the user to interact with an application-based avatar associated with the executing application.

2. The method of claim 1, wherein
the user-selected diorama is configured to interact with a different executing application.

3. The method of claim 1, wherein
the dioramic system is configured to present a set of recommended avatars to the end user device based upon a usage pattern of monitored user interactions.

4. The method of claim 1, wherein
an appearance of the application-based avatar changes based upon a current state of the executing application.

5. The method of claim 1, wherein
an appearance of the application-based avatar changes based upon cumulative interactions by the user with the executing application.

6. The method of claim 1, wherein
the user-selected diorama includes a second user avatar representing a second user,
the second user interacts with the executing application using a second diorama different than the user-selected diorama.

7. A computer hardware system including a diorama system, comprising:
    a computer configured to initiate the following executable operations:
        establishing a layer of abstraction between an executing application and a dioramic user interface within an end user device of a user;

modifying the dioramic user interface using a diorama selected by the user;

receiving, by the layer of abstraction, a user interaction with the dioramic user interface by the user;

facilitating an interaction with the executing application based upon the user interaction; and causing the diorama to be updated within the dioramic user interface based upon the user interaction, wherein the dioramic user interface
- is a three dimensional user interface independent of the executing application,
- visually represents a person and an entity with which the user interacts, respectively, as avatars in the user-selected diorama, and
- is unique to the user, the user-selected diorama is an independent software object that is rendered by a user interaction runtime engine that provides the dioramic user interface, the user-selected diorama includes a second user avatar representing a second user, and the second user interacts with the executing application using a second diorama different than the user-selected diorama.

8. The system of claim 7, wherein
the user-selected diorama is configured to interact with a different executing application.

9. The system of claim 7, wherein
the dioramic system is configured to present a set of recommended avatars to the end user device based upon a usage pattern of monitored user interactions.

10. The system of claim 7, wherein
the user interacts with the executing application by directing an avatar of the user to interact with an application-based avatar associated with the executing application.

11. The system of claim 10, wherein
an appearance of the application-based avatar changes based upon a current state of the executing application.

12. The system of claim 10, wherein
an appearance of the application-based avatar changes based upon cumulative interactions by the user with the executing application.

13. A computer program product, comprising:
a hardware storage device having stored therein program instructions,
the program instructions, which when executed by computer hardware system including a diorama system, causes the computer hardware system to perform:

establishing a layer of abstraction between an executing application and a dioramic user interface within an end user device of a user;

modifying the dioramic user interface using a diorama selected by the user;

receiving, by the layer of abstraction, a user interaction with the dioramic user interface by the user;

facilitating an interaction with the executing application based upon the user interaction; and causing the diorama to be updated within the dioramic user interface based upon the user interaction, wherein the dioramic user interface
- is a three dimensional user interface independent of the executing application,
- visually represents a person and an entity with which the user interacts, respectively, as avatars in the user-selected diorama, and
- is unique to the user, the user-selected diorama is an independent software object that is rendered by a user interaction runtime engine that provides the dioramic user interface, and the user interacts with the executing application by directing an avatar of the user to interact with an application-based avatar associated with the executing application.

14. The computer program product of claim 13, wherein
the user-selected diorama is configured to interact with a different executing application.

15. The computer program product of claim 13, wherein
the dioramic system is configured to present a set of recommended avatars to the end user device based upon a usage pattern of monitored user interactions.

16. The computer program product of claim 13, wherein
an appearance of the application-based avatar changes based upon a current state of the executing application.

17. The computer program product of claim 13, wherein
the user-selected diorama includes a second user avatar representing a second user, the second user interacts with the executing application using a second diorama different than the user-selected diorama.

* * * * *